United States Patent [19]
Rodrigues

[11] Patent Number: 5,335,726
[45] Date of Patent: Aug. 9, 1994

[54] WATER CONTROL

[75] Inventor: Klein A. Rodrigues, Duncan, Okla.

[73] Assignee: Halliburton Company, Duncan, Okla.

[21] Appl. No.: 141,302

[22] Filed: Oct. 22, 1993

[51] Int. Cl.$^5$ .......................................... E21B 33/138
[52] U.S. Cl. ................................... 166/295; 166/294; 523/130
[58] Field of Search .................. 166/294, 295, 300; 405/264; 523/130, 132

[56] References Cited

U.S. PATENT DOCUMENTS

| | | | |
|---|---|---|---|
| 3,334,689 | 8/1967 | McLaughlin | 166/295 |
| 3,490,533 | 1/1970 | McLaughlin | 166/270 |
| 3,857,443 | 12/1974 | Cole | 166/295 |
| 4,070,865 | 1/1978 | McLaughlin | 405/264 |
| 4,527,628 | 7/1985 | Dill et al. | 166/295 |
| 4,637,467 | 1/1987 | Shaw et al. | 166/294 X |

OTHER PUBLICATIONS

"Synthetic hydrogels: 1. Hydroxyalkyl acrylate and methacrylate copolymers—water binding studies" by Phillip H. Corkhill, et al., *Polymer*, 1987, vol. 28, Sep.
*Encyclopedia of Polymer Science and Engineering*, vol. 7, John Wiley & Sons, New York, pp. 514–516, 531 (1987).
"Treatment of Injection and Producing Wells with Monomer Solution", by H. C. McLaughlin, et al., SPE 5364, Mar. 24–25, 1975.
"*Encyclopedia of Chemical Technology*", vol. 1, 3rd Edition, John Wiley & Sons, New York, pp. 298–303, 311 (1978).

*Primary Examiner*—George A. Suchfield
*Attorney, Agent, or Firm*—Robert A. Kent; Thomas R. Weaver

[57] ABSTRACT

A method of forming a gel in a subsurface formation is provided whereby a monomer is polymerized in the formation in the presence of a crosslinker by an initiator selected from azo compounds which are temperature activated over a range of temperatures. The method is particularly useful to substantially terminate or at least decrease the flow of water from a subterranean formation into a wellbore penetrating the formation.

16 Claims, No Drawings

WATER CONTROL

BACKGROUND OF THE INVENTION

1. Technical Field of the Invention

This invention broadly relates to the treatment of a subsurface earth formation which is penetrated by a borehole. The invention further relates to a method of decreasing the rate of flow of water from a subterranean formation into a borehole which penetrates the formation. This invention more specifically pertains to the introduction of a polymerizable monomer and a crosslinking monomer into a water-containing subterranean formation penetrated by a wellbore and causing the monomer to form a gel in the formation. The polymerization is produced by using a temperature activated compound whereby the polymerization is predictable, reproducible and not affected by oxidation/reduction reactions.

2. Related Art and Problems Solved

When performing various types of operations below the surface of the earth a problem often encountered which interferes with the operation is the undesirable flow of water from a subsurface formation into a work space or volume which penetrates the formation. Such operations can include, but are not limited to, mining operations, foundation construction, road and bridge construction, oil production and similar operations which require excavation into or penetration of earth structures having permeabilities conducive to the flow of water.

The related problem of terminating, or at least reducing, such undersireable flow of water has been attempted to be solved by various means. The solutions attempted have involved, among other things, pumping unwanted water from the work space, erecting barriers, e.g., a casing, at the interface between the space and the formation to prevent the flow of water from the formation into the work space and decreasing the permeability of the formation itself by introducing a material, e.g., a grout, into the formation.

It is well known that both oil and water are produced during the ordinary recovery of oil from a subterranean formation. If the ratio of water to oil, i.e., the water-oil ratio or WOR, is low, then the produced water can be handled and disposed of in a manner which will not unreasonably reduce the economic benefits derived from the produced oil. In such instances, water control can simply involve pumping the water from the well and storing or otherwise disposing of it in some acceptable fashion. However, if the WOR is so high that the various costs of pumping, handling, storing and disposing of the produced water exceeds the economic benefits of the produced oil, then the well is either abandoned or an alternate water control technique is employed.

One alternate water control method is disclosed by McLaughlin in U.S. Pat. No. 3,334,689, wherein an aqueous solution of a polymerizable composition containing a monoethylenically unsaturated acrylate monomer and a crosslinking agent are injected into the formation producing the water. The monomer and crosslinking agent are caused to form a stable crosslinked gel in the formation to thus reduce the water permeability of the formation and thereby terminate or at least decrease the rate of flow of water from the formation.

McLaughlin, in U.S. Pat. No. 3,490,533, discloses injecting into a subterranean formation an aqueous solution of a polymerizable monomer having dissolved therein a polymerization catalyst, i.e., an initiator, having a latent period. The monomer polymerizes in the formation after the latent period of the catalyst has expired. McLaughlin describes the product of the polymerization as a viscous polymer solution. In the practice of the invention, McLaughlin discloses the use of monomers having at least one carbon-to-carbon double bond to which can be added a crosslinking monomer, such as a diallyl monomer, if polymer crosslinking is desired. McLaughlin discloses that excess crosslinking monomer causes gelation which creates a plug rather than a desired viscous, but still flowable fluid. In other words, McLaughlin discloses that a plug can be formed in the formation if a crosslinking monomer is combined with his polymerizable monomer. McLaughlin, by way of example, thus discloses that a crosslinked polymer can be produced by polymerizing acrylamide in the presence of methylene bisacrylamide or the crosslinking monomers disclosed in U.S. Pat. No. 3,334,689 referred to above.

In each of the prior art methods referred to above, the aqueous solution of polymerizable monomer and crosslinking agent also includes a polymerization initiator. The initiators employed are disclosed to be selected from persulfates, amines and peroxides. Specific initiators known to be employed in existing polymerization systems include sodium persulfate and triethanol amine, potassium persulfate and ammonium persulfate and tertiary butyl hydroperoxide.

The initiators heretofore employed are activated by a number of mechanisms including heat and oxidation/reduction reactions and are well known to be difficult to use because their activation is difficult to control, thus rendering unpredictable the time to produce a gel from the aqueous solution containing the monomer, crosslinker and initiator.

It is thus an object of this invention to produce a crosslinked polymer in a formation by use of an initiator whose activation can be controlled in order to enable the prediction of the time required to produce a gel from an aqueous solution containing a polymerizable monomer, a crosslinking agent and an initiator.

SUMMARY DISCLOSURE OF THE INVENTION

By this invention, there is thus provided a method of forming a crosslinked polymer within a subterranean formation by introducing into the formation a polymerizable monomer and a crosslinking monomer together with a polymerization initiator, i.e., a catalyst, and permitting said polymerizable monomer to polymerize and crosslink in the formation.

The polymerizable monomers of this invention, in broad terms, are water soluble, vinyl monomers preferably selected from compounds represented by the general formula

wherein:

$R_1 = -CH_3$ or $-H$,

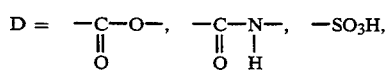

-continued

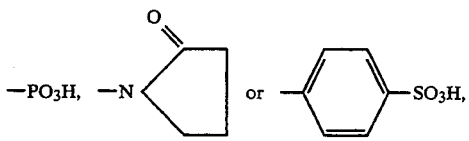

E = $-N(C_nH_{2n+1})_a$, $-C(CH_3)_2SO_3H$ or $-H$, n=1 or 2, a=2 or 3,
m=0, 1, 2 or 3 and b=0 or 1;
when

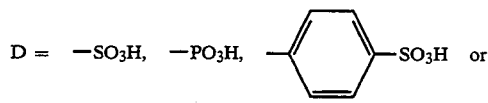

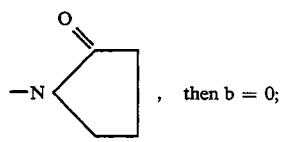, then b = 0;

when

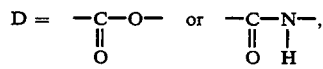

then b=1; and
when
a=3, then a suitable counter ion is present.
In preferred embodiments

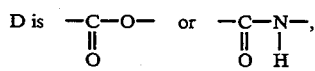

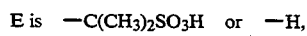

b is 1 and m is 0 or 1.

The crosslinking agents of this invention, in broad terms, are multifunctional, vinyl monomers preferably selected from compounds represented by the general formulas selected from the group consisting of $$G(B-F-A)_x \qquad (2)$$
$$B(F-A)_2 \qquad (3) \text{ and}$$
$$AG(F-A); \qquad (4)$$

wherein

-continued

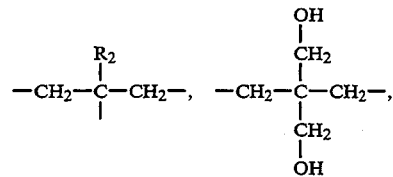

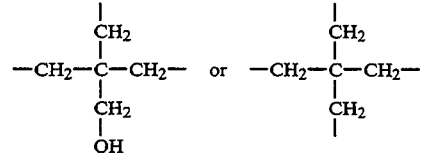

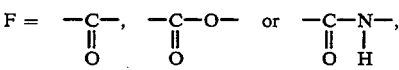

F can be the same or different, $R_2 = -(C_fH_{2f+1})-$ or $-H$, d=2 or 3,
e=0-20,
f=1 or 2 and
x=2, 3 or 4.

The controllable initiator of this invention, in broad terms, is a water soluble azo compound defined by the general formula $$K-N=N-L \qquad (5)$$

which is defined and discussed below.

The method of this invention of forming a crosslinked polymer in a subterranean formation is very useful as a means of forming a plug or block in the permeable portion of a water producing subterranean formation. The plug will terminate, or at least decrease, the flow of water from the formation into a space, such as a wellbore, which penetrates the formation. By decreasing the production of water from the formation itself, the method of this invention, serves to eliminate the need for extensive surface equipment devoted to the handling, storage and disposal of produced water.

DESCRIPTION OF THE PREFERRED EMBODIMENTS

The monomers employed in the method of this invention are water soluble materials which, in the presence of a crosslinking agent and the water soluble initiator of this invention, will form polymers which will crosslink. For purposes of this invention, the monomers employed herein are referred to as water soluble vinyl monomers; the crosslinking agents are referred to as multifunctional vinyl monomers; the initiators are water soluble azo compounds; and the produced products are referred to as gels. A gel is defined herein as a cross-linked polymer network swollen in a liquid medium.

For functional purposes of this invention, a polymer is a viscous fluid which will flow under stress as contrasted with a gel which is a fluid which will not flow.

Water solutions of the monomers useful herein, prior to reaction, exhibit very low viscosities and readily flow in pipe ordinarily employed in wellbores and will also readily flow into the permeable portions of a subterranean formation. However, when the water soluble vinyl monomers useful herein react with the multifunctional vinyl monomers, gels are formed, some of which are referred to as rigid gels and some of which are referred to as soft gels.

A "rigid gel," as defined herein, is a gel, as previously defined, which will not release water bound within the crosslinked polymer network upon application of moderate pressure. In contrast, a "soft gel," as defined herein, includes water which is not bound in the network by molecular interaction as strong as that in a rigid gel. Accordingly, a soft gel is like a sponge in that it will release water bound within the crosslinked polymer network upon application of slight pressure.

The concept of "rigid gels" and "soft gels" is more rigorously discussed by Corkhill, et al., in "Synthetic hydrogels: 1. Hydroxyalkyl acrylate and methacrylate copolymers—water binding studies" Vol 28 *Polymer*, Sep. 1987 at 1758 et seq As far as usefulness in this invention is concerned, a monomer of this invention which produces a rigid gel will form a plug in a formation which will substantially terminate the flow of water through the formation. Whereas a monomer of this invention which produces a soft gel will form a plug in a formation which will decrease the flow of water through the formation.

According to a method of this invention, a gel is formed in a formation penetrated by a borehole as follows. The location in the formation where the gel is to be formed is first identified by known means, such as by logging. In the case of a wellbore penetrating a subsurface formation containing a zone which produces water, the flow of which is desired to be terminated or decreased, the zone is isolated by known means and then an aqueous solution containing the polymerizable monomer of this invention, as set out in formula (1), above, a crosslinking agent, as set out in formulas (2), (3) and (4), above, and an azo initiator, as set out in formula (5) above, is injected into the formation by way of the wellbore. The quantity of solution injected is based upon the depth of penetration desired, the volume of the zone to be treated and the permeability and other physical properties of the material in the zone. It is, of course, desirable that the pressure employed to inject the solution not be high enough to create a fracture in the zone or to damage equipment in the wellbore. Pumping pressures and formation fracturing are well known problems and beyond the scope of this invention.

After the solution is in place in the zone, the polymerizable monomer is permitted to form a gel therein prior to conducting further operations in the wellbore. The time required to form the gel, as will be further discussed below, can be controlled to be in the range of from about one half hour to several days.

The polymerizable monomer of this invention, which is a water soluble, vinyl monomer, and the multifunctional vinyl monomer can be injected into the formation in undiluted form together with the water soluble azo polymerization initiator. However, it is more convenient, and thus preferred, to first dissolve the monomer and crosslinking agent in water to form an aqueous monomer solution and then to inject the monomer solution together with the initiator into the desired zone by way of the wellbore.

The monomer solution is broadly comprised of water, the water soluble vinyl monomer and the multifunctional vinyl monomer defined above. Prior to introduction of the monomer solution into the formation, it is mixed with the water soluble azo polymerization initiator. Since polymerization ordinarily begins immediately upon mixing the monomer, the crosslinker and initiator, mixing is preferably delayed until the monomer solution is introduced into the wellbore at the surface of the earth.

Furthermore, since polymerization causes an increase in viscosity of the solution, and since the viscosity of the solution containing the initiator must be low enough to permit penetration into the desired zone, it may be necessary to cause a delay in polymerization in order to delay an increase in viscosity. Delaying the onset of polymerization is particularly important if there is an extended period of time between mixing initiator and solution and placing all of the required monomer into the desired zone. Accordingly, a delay in polymerization can be obtained by mixing with the monomer solution, along with the initiator, a quantity of material, referred to herein as a scavenger, which will react with the initiator to thereby prevent the initiator from reacting with the monomer. Polymerization will not commence until all of the scavenger is consumed by reaction.

In more technical terms, initiators employed herein form free radicals which in turn initiate polymerization. Accordingly, any material which will react with the free radical before the free radical can initiate polymerization is referred to as a free radical scavenger or simply as a scavenger. Scavengers include naturally and accidentally occurring ingredients, such as oxygen, as well as materials deliberately added to the reaction mass to delay polymerization.

The aqueous monomer solution containing the polymerizable monomer and crosslinker can also contain a clay control agent, such as potassium chloride, which will not interfere with the polymerization, but which will help prevent formation damage which can be caused by water, different from formation water, which contacts clay in the formation. It has been observed that the water used to dissolve the polymerizable monomer can contain in the range of from about 2 to about 4 pounds potassium chloride per 98 pounds of water.

The pH of the aqueous solution containing the polymerizable monomer should preferably be adjusted to a value in the range of from about 4.5 to about 6.5 prior to addition of initiator. It has been observed that an aqueous solution of ammonium acetate and acetic acid is useful to adjust pH to a value within the desired range.

The minimum quantity of water soluble, vinyl monomer required to produce a gel useful herein to form a plug in a formation is present in aqueous solution in an amount of about two pounds per 100 pounds of aqueous solution. Satisfactory results can be obtained if the water soluble vinyl monomer is present in an amount in the range of from about 5 to about 20 and preferably from about 10 to about 15 pounds of the water soluble vinyl monomer per 100 pounds of aqueous solution.

Examples of water soluble, vinyl monomers useful herein which are within the scope of formula (1), above, include acrylic acid, methacrylic acid, acrylamide, methacrylamide, 2-methacrylamido-2-methyl propane sulfonic acid, 2-acrylamido-2-methyl propane sulfonic acid, N,N-dimethyl acrylamide, vinyl sulfonic acid, N,N-dimethylaminoethylmethacrylate, 2-triethylammoniumethyl methacrylate chloride, N, N-dimethylaminopropyl methacrylamide, methacrylamidopropyl trimethylammonium chloride, N-vinyl pyrrolidone, vinyl phosphonic acid and methacryloyloxyethyl trimethylammonium sulfate.

Water soluble vinyl monomers preferred for use herein are acrylic acid and 2-acrylamido-2-methyl propane sulfonic acid.

The ability of the monomer solution of this invention to form a gel plug in a subsurface formation which will terminate, or substantially terminate, the flow of water through the formation is, in addition to the quantity of water soluble vinyl monomer, also dependent upon the concentration of the multifunctional vinyl monomer crosslinker in the aqueous monomer solution. Accordingly, the amount of crosslinker to be employed is an amount in the range of from about 0.05 to about 5 and preferably from about 0.5 to about 1.0 pounds of crosslinker per 100 pounds of monomer solution.

Examples of multifunctional vinyl monomers useful herein which are within the scope of formula (2), above, include glycerol dimethacrylate, glycerol diacrylate, ethoxylated glycerol dimethacrylate, ethoxylated glycerol diacrylate, propoxylated glycerol dimethacrylate, propoxylated glycerol diacrylate, ethoxylated glycerol trimethacrylate, ethoxylated glycerol triacrylate, propoxylated glycerol trimethacrylate, propoxylated glycerol triacrylate, ethoxylated trimethylol propane trimethacrylate, propoxylated trimethylolpropane trimethacrylate, ethoxylated trimethylolpropane triacrylate, propoxylated trimethylolpropane triacrylate, ethoxylated or propoxylated pentaerythritol di, tri or tetra methacrylate or acrylate, methylene-bis-acrylamide and methylene-bis-methacrylamide.

Examples of multifunctional vinyl monomers useful herein which are within the scope of formula (3), above, include polyethylene or polypropylene glycol diacrylate or dimethacrylate.

Examples of multifunctional vinyl monomers useful herein which are within the scope of formula (4), above include allylmethacrylate and allylacrylate.

The polymerization initiator employed herein can be any suitable water soluble azo compound or compounds which form free radicals in aqueous solution. Azo polymerization initiators are employed because of problems encountered with other compounds which form free radicals which include, but which are not limited to, alkali metal persulfates, such as, sodium persulfate, potassium persulfate and ammonium persulfate; peroxides, such as hydrogen peroxide and tertiary-butyl hydroperoxide; oxidation-reduction systems employing reducing agents, such as, bisulfite, sulfite, thiosulfate and metabisulfite in combination with oxidizers such as silver(I), copper(I), Iron(III), chlorite and hydrogen peroxide.

The alkali metal persulfates and the peroxides, referred to above, form free radicals in several ways. In one way, these compounds form free radicals upon being exposed to heat, that is, they are temperature activated. Upon being activated at a certain temperature, half of the molar amount of the compound decomposes to form free radicals within a set period of time. This is called the half-life of the initiator. The process of decomposition continues at an exponentially declining rate until polymerization is initiated. The polymerization reaction produces heat, therefore, the rate of decomposition rapidly increases and increases the rate of gelation. If all of the polymerizable material is gelled before it can be placed in the desired location, then, for purposes of this invention, the result is referred to as pre-mature gelation.

It is to be understood that compounds which produce free radicals upon exposure to heat will produce free radicals at all temperatures, therefore, for purposes of this invention, the term activation temperature means that temperature at which half the molar amount of a compound will convert to free radicals in a period of 10 hours. The activation temperature of sodium persulfate is approximately 142° F.

The persulfates and peroxides can also be activated to produce free radicals by reaction with an amine or a metal ion, such as ferrous ion, in an oxidation-reduction (redox) system. Examples of amine compounds and metal compounds useful in such redox systems include triethanolamine, tetraethylene pentaamine, ferrous ion and the like. As with free radical generation by temperature activation, generation of free radicals by redox system can also result in premature gelation.

If the activation temperature is greater than the temperature of the formation into which the monomer is placed, then oxidation-reduction initiation must be employed which may require the use of a scavenger to prevent premature gelation. In the situation where the activation temperature and formation temperature are substantially the same such that intentional oxidation-reduction initiation is apparently not required, the use of an unknown quantity of scavenger may nevertheless be required because of the possibility of unintended oxidation reduction initiation.

It has been mentioned that all of the monomer solution should be injected into the desired location in the formation before the solution experiences an increase in viscosity. Accordingly, to delay polymerization and the consequent increase in solution viscosity, polymerization can be retarded by combining with the monomer solution and initiator a quantity of free radical scavenger in amount sufficient to preferentially react with free radicals produced by the initiator to prevent premature gelation. It is believed that polymerization should be delayed to provide a placement, or pumping, time of from about four to about six hours. This length of time can be provided by a quantity of scavenger in an amount in the range of from 0 to about 1 mole per mole of initiator employed. Free radical scavengers which can be used herein are potassium ferricyanide, hydroquinone and monomethyl ether of hydroquinone.

The preferred scavenger is potassium ferricyanide.

The persulfate, peroxide and oxidation-reduction initiators mentioned above, as disclosed, can be activated by temperature and oxidation-reduction reactions (or both) neither of which is necessarily satisfactory in situations where unintended oxidation reduction can occur. In this regard, it is noted that ferrous ion, for example, can be a reductant in the redox systems of persulfate or peroxide initiators. Since ferrous ion is probably to be found in steel conduits employed in monomer solution placement, then the probability of premature gelation should be anticipated. It has accordingly been the practice to clean or otherwise treat such conduits to minimize the dissolution of ferrous ion before placing the monomer solution therein in an attempt to avoid premature gelation.

In view of the above problems, a free radical polymerization initiator is required which is temperature activated at various temperatures and which is not activated by any oxidation reduction mechanism. Such a free radical initiator is provided by the azo compounds defined in formula (5) below.

$$K-N=N-L \quad (5)$$

wherein:

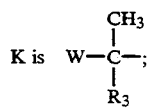
K is $W-\underset{\underset{R_3}{|}}{\overset{\overset{CH_3}{|}}{C}}-$;

L is K or $R_4$;

$R_3$ is $-CH_3$ or $-C\equiv N$;

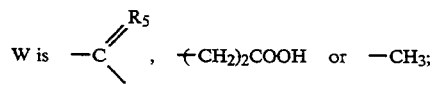
W is $-C\underset{R_6}{\overset{R_5}{\diagup\!\!\!\diagdown}}$, $-(CH_2)_2COOH$ or $-CH_3$;

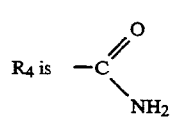
$R_4$ is $-C\underset{NH_2}{\overset{O}{\diagup\!\!\!\diagdown}}$ $R_5$ is $=N-$, $=NH$ or $=O$; and $R_6$ is $-\overset{|}{N}H$; $-NH_2$, $-NH(CH_2)_2OH$, $-NHC(CH_2OH)_2CH_3$ or $-NHC(CH_2OH)_3$;

when $R_5$ is $=N-$, then $R_6$ is $-\overset{|}{N}H$; and when

L is $R_4$, then $R_3$ is $-C\equiv N$ and

W is $-CH_3$.

The azo polymerization initiators within the scope of formula (5) which are preferred for use herein are defined by the formula $$K-N=N-K \quad (6)$$

and are commercially available from WAKO Pure Chemical Industries, Ltd. These azo initiators have activation temperatures ranging from about 111° F. to about 190° F. Accordingly, by determining the temperature of the formation into which the monomer solution is to be placed, a compound within the scope of formula (5), above, can be selected for polymerization initiation which has an activation temperature equal to or slightly less than the temperature of the formation. Furthermore, since the compounds within the scope of formula (5) are not activated by oxidation reduction mechanism, the need for a scavenger is eliminated.

The most preferred azo compounds for use herein, all of which are within the scope of formula (6), are 2,2'-Azobis(N,N'-dimethylene isobutyramidine)dihydrochloride, referred to herein as initiator I-44; 2,2'-Azobis(2-amidinopropane)dihydrochloride, referred to herein as initiator I-50; and 2,2'-Azobis[2-methyl-N-(2-hydroxyethyl)propionamide], referred to herein as initiator I-86.

The activation temperatures of initiators I-44, I-50 and I-86 are 111° F., 133° F. and 187° F. respectively.

The quantity of azo initiator employed is an amount in the range of from about 0.001 to about 2.0, preferably 0.01 to about 1 and still more preferably from about 0.05 to about 0.5 percent initiator by weight of monomer solution.

It is noted that the azo initiators can be employed with free radical scavengers, such as those named above, if desired. The quantity of scavenger to be used is the same as mentioned previously.

In a preferred embodiment of this invention, the monomer solution employs the monomers acrylic acid and 2-acrylamido-2-methylpropane sulfonic acid and the crosslinking agents glycerol dimethacrylate and polyethylene glycol dimethacrylate and any one of the initiators I-44, I-50 and I-86.

The following examples are provided to further illustrate the invention and should not be construed to unduly limit the scope thereof.

EXAMPLE I

Compounds were polymerized and crosslinked to determine the nature of the reaction product. In all instances the polymerization was conducted in the presence of a crosslinking agent.

The polymerization was conducted by dissolving the compound in a quantity of deionized water in the presence of a crosslinking agent. After the solution was purged with nitrogen to remove oxygen, the solution was placed in a water bath maintained at 60° C. and reaction was commenced upon addition of an initiator.

The initiator employed consisted of 1.0 milliliters of a 10 percent by weight aqueous solution of initiator 1-50.

The compounds polymerized and the crosslinking agents are identified in Table I below. The test results are provided in Table II below.

TABLE I

| Compound Name | Abbreviation |
| --- | --- |
| Monomers | |
| sodium acrylate | SA |
| acrylic acid | AA |
| 2-acrylamido-2-methylpropane sulfonic acid | AMPS |
| Crosslinkers | |
| polyethyleneglycol dimethacrylate | PEGDMA |
| glycerol dimethacrylate | GLYDMA |
| allyl methacrylate | ALYMA |
| methylene-bis-acrylamide | MBA |

TABLE II

| Run No. | Monomer | Grams | Cross-linker | ml | Water, Grams | Result |
| --- | --- | --- | --- | --- | --- | --- |
| 1 | AA | 10 | MBA | 0.5 | 90 | Rigid gel |
| 2 | AA | 10 | PEGDMA | 0.5 | 90 | Rigid gel |
| 3 | AA | 10 | GLYDMA | 0.5 | 90 | Rigid gel |
| 4 | AA | 10 | ALYMA | 0.5 | 90 | Rigid gel |
| 5 | AMPS | 20 | PEGDMA | 1.0 | 80 | Rigid gel |
| 6 | AMPS | 20 | GLYDMA | 1.0 | 80 | Rigid gel |
| 7 | AMPS | 20 | ALYMA | 1.0 | 80 | Rigid gel |
| 8 | SA | 13 | MBA | 0.5 | 87 | Rigid gel |

From the data in Table II, it can be concluded that a combination of a water soluble vinyl monomer, a multifunctional crosslinker, together with a suitable temperature activated azo initiator will form a rigid gel. As the molecular weight of the monomer increases, the amount of monomer required to form a rigid gel increases. The molecular weight of AA, SA and AMPS is 72, 94 and 207 respectively. The amount of monomer required to form a rigid gel is 10, 13, and 20 wt % respectively.

EXAMPLE II

Tests were performed to determine the time required for a monomer and a crosslinker to form a gel, i.e., gel time. The tests were conducted at temperatures in the range of from 90° F. to 150° F. The monomer employed in the tests was sodium acrylate (SA) in a water solution. The crosslinker employed was methylene-bis-acrylamide (MBA). The initiator employed in the tests was the dihydrochloride salt of the diazo compound, 2,2'-Azobis(2-amidinopropane) in a 10 percent by weight water solution. For convenience, the initiator employed is referred to herein as initiator I-50.

In some of the tests, a 1 percent by weight aqueous solution of potassium ferricyanide, $K_3Fe(CN)_6$, (referred to herein for convenience as KF), a free radical scavenger, was employed to delay the initiation of the polymerization reaction to thereby increase gell time.

Each of the tests employed 200 grams of a 13 percent by weight water solution of SA, the recipe of which is set out below.

| | |
|---|---|
| Duncan, Oklahoma, tap water | 176.4 grams |
| Potassium Chloride 3.6 grams | |
| SA (25 wt %) | 104.0 grams |
| MBA | 1.0 grams |

The pH of each one of the above 200 gram solutions was adjusted to a value of about 5.8 by addition thereto of about 0.1 milliliters of a solution of ammonium acetate and acetic acid; a quantity of KF, if used, was also added to the solution. Thereafter, I-50 was added to initiate reaction and then the test solution was brought to the test temperature.

The test results are set out in Tables IIIA–IIID, below.

TABLE III, A

Gel Time, minutes, at various test temperatures, °F., 200 grams 13% aqueous solution SA 1 ml, 10% aqueous solution I-50

| | Gel Time, minutes at X° F. | | | | | | |
|---|---|---|---|---|---|---|---|
| KF ml | 90 | 100 | 110 | 120 | 130 | 140 | 150 |
| 0 | | | | | | | |
| 1 | | | | 239 | | | |
| 2 | | | | 361 | 208 | 88 | |
| 3 | | | | 720 | 248 | | 75 |
| 4 | | | | <1256 | 338 | 165 | |
| 5 | | | | | 976 | | |
| 6 | | | | | | 313 | 140 |
| 7 | | | | | | | |
| 8 | | | | | | 760 | |
| 9 | | | | | | | 858 |
| 12 | | | | | | | * |

*a gel did not form in 24 hours

TABLE III, B

Gel Time, minutes, at various test temperatures, °F., 200 grams 13% aqueous solution SA 2 ml, 10% aqueous solution I-50

| | Gel Time, minutes at X° F. | | | | | | |
|---|---|---|---|---|---|---|---|
| KF ml | 90 | 100 | 110 | 120 | 130 | 140 | 150 |
| 0 | | | | | | | |
| 1 | | | 239 | | | | |
| 2 | | | 503 | | | | |
| 3 | | | 593 | | | | |
| 4 | | | 1009 | | | | |
| 5 | | | | | | | |
| 6 | | | | | | | |
| 7 | | | | | | | |
| 8 | | | | | | | |
| 9 | | | | | | | |
| 10 | | | | | | | |

TABLE III, C

Gel Time, minutes, at various test temperatures, °F., 200 grams 13% aqueous solution SA 3.6 ml, 10% aqueous solution I-50

| | Gel Time, minutes at X° F. | | | | | | |
|---|---|---|---|---|---|---|---|
| KF ml | 90 | 100 | 110 | 120 | 130 | 140 | 150 |
| 0 | | | | | | | |
| 1 | | 300 | | | | | |
| 2 | | 607 | | | | | |
| 3 | | 998 | | | | | |
| 4 | | * | | | | | |
| 5 | | | | | | | |
| 6 | | | | | | | |
| 7 | | | | | | | |
| 8 | | | | | | | |
| 9 | | | | | | | |
| 10 | | | | | | | |

*a gel did not form in 24 hours

TABLE III, D

Gel Time, minutes, at various test temperatures, °F., 200 grams 13% aqueous solution SA 4 ml, 10% aqueous solution I-50

| | Gel Time, minutes at X° F. | | | | | | |
|---|---|---|---|---|---|---|---|
| KF ml | 90 | 100 | 110 | 120 | 130 | 140 | 150 |
| 0 | 270 | | | | | | |
| 0.5 | 431 | | | | | | |
| 1 | 636 | | | | | | |
| 1.5 | <1300 | | | | | | |

From Table III, above, it is evident that at any given test temperature, gel time, for a particular SA solution, increases with increasing concentration of KF scavenger. It is further indicated in Table III that an increase in temperature produces a decrease in gel time at constant concentration of SA solution, KF scavenger and initiator.

EXAMPLE III

Tests were performed to determine the ability of a monomer to form a plug in a subterranean formation. In a typical test, approximately 10 pore volumes of an aqueous monomer solution of sodium acrylate (SA) and a crosslinker are introduced into a Berea Sandstone Core and allowed to form a gel therein. After the gel is formed the ability of water to flow through the gel-containing core is determined.

The test procedure is as follows.

API brine is passed through a Berea Core of known dimensions under constant pressure differential and at a specified temperature until a constant flow rate is obtained. The flow of brine is simulated from the formation side of the core to the wellbore side of the core. This is referred to as production direction. The data recorded is employed to calculate initial permeability.

An aqueous solution of SA is then injected into the core at the specified temperature. Approximately 10 pore volumes of solution are passed through the core from the wellbore side of the core to the formation side of the core. This is referred to as treatment direction.

The core containing the solution of SA is then placed in a bottle together with a quantity of the injected SA solution. The bottle is completely filled with the core and the SA solution so that there is no air space. The bottle is sealed and then placed in a water bath maintained at the specified temperature. The bottle remains in the bath for about one day to permit a gel to form in the core.

The core is then removed from the bottle and API brine is passed through the core in the production direction under a constant differential pressure and at the specified temperature until a constant flow rate is obtained. The data recorded is employed to calculate final permeability.

The initial permeability and the final permeability are compared to determine the effectiveness of the tested SA solution to form a gel which will stop or at least decrease the flow of water through the core. The ratio of the final permeability, Kf, to the initial permeability, Ki, indicates the effectiveness of the SA solution, wherein a ratio of less than 1 (100%) indicates the formation of a gel in the core.

A more specific description of the apparatus employed and the method of operating the apparatus is provided in U.S. Pat. No. 4,097,904.

The content of each SA solution tested is set out in Table IV, below.

The test results are set out in Table V, below.

TABLE IV

| | FORMULATION | |
|---|---|---|
| Ingredient[1] | 1 | 2 |
| Duncan, OK, Tap Water | 231.8 | 231.8 |
| KCl[2] | 4.6 | 4.6 |
| SA (25 wt %) | 261.6 | 261.6 |
| initiator[5] | 10 | 2.5 |
| Scavenger[3] | 0 | 15 |
| pH adjusting[4] material | 3.2 | 3.2 |
| MBA (Crosslinker) | 2.5 | 2.5 |

Notes:
[1] All quantities of water, KCl, MBA and SA are in grams. All quantities of initiator, scavenger and pH adjusting material are in milliliters.
[2] potassium chloride
[3] potassium ferricyanide, $K_3Fe(CN)_6$, 1 percent by weight aqueous solution
[4] pH adjusted to a value of 5.8 by addition of a solution of ammonium acetate and acetic acid
[5] 10 percent by weight aqueous solution of the dihydrochloride salt of 2,2'-Azobis(2-amidinopropane), i.e., initiator I-50

TABLE V

| | TEST # | |
|---|---|---|
| Data | 1 | 2 |
| Core Size, cm L & D | 6.89 × 2.38 | 7.2 × 2.38 |
| Test Temp, °F. | 90 | 150 |
| Formulation | 1 | 2 |
| % SA | 13 | 13 |
| ml | 100 | 100 |
| initial brine flow | | |
| diff pressure, psi | 40 | 40 |
| flow rate, ml/min | 14.9 | 13.6 |
| Ki permeability, mD | 129.0 | 103.1 |
| final brine flow | | |
| diff pressure, psi | 40 | 40 |
| flow rate, ml/min | 8.51 | 3.14 |
| Kf permeability, mD | 73.8 | 23.8 |
| Kf/Ki | 0.57 | 0.23 |

The data in Table V indicates that a rigid gel can be produced in a formation by treating the formation with an aqueous solution of a water soluble vinyl monomer, a multifunctional monomer and a temperature activated azo initiator. This gel will decrease the permeability of the formation thus reducing the amount of water produced therefrom.

Having described the invention that which is claimed is:

1. A method of decreasing the rate of flow of water from a subterranean formation into a wellbore penetrating said formation, said method being comprised of the steps of
   introducing into said formation at least one polymerizable water soluble vinyl monomer and at least one multifunctional vinyl monomer crosslinker together with a water soluble azo initiator and
   permitting said polymerizable monomer to polymerize and crosslink in said formation
   to thereby decrease the rate of flow of water from said formation.

2. The method of claim 1 wherein said azo initiator is represented by the general formula

K—N=N—L wherein:

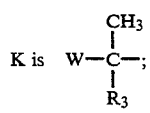

K is
$$K \text{ is } W-\underset{R_3}{\overset{CH_3}{\underset{|}{\overset{|}{C}}}}-;$$

L is K or $R_4$;

$R_3$ is —$CH_3$ or —C≡N;

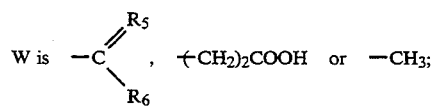

W is —C(=$R_5$)($R_6$), ‐($CH_2$)$_2$COOH or —$CH_3$;

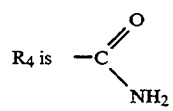

$R_4$ is —C(=O)($NH_2$)

$R_5$ is =N—, =NH or =O; and $R_6$ is —$\overset{|}{N}H$; —$NH_2$, —NH($CH_2$)$_2$OH, —NHC($CH_2$OH)$_2$$CH_3$ or —NHC($CH_2$OH)$_3$;

when $R_5$ is =N—, then $R_6$ is —$\overset{|}{N}H$; and when

L is $R_4$, then $R_3$ is —C≡N and

W is —$CH_3$.

3. The method of claim 2 wherein said polymerizable monomer is introduced into said formation in undiluted form or in an aqueous solution consisting of at least about 2 pounds of said monomer per 100 pounds of said aqueous solution, and said crosslinker is introduced therein in an amount in the range of from about 0.05 to about 5 pounds per 100 pounds of said aqueous solution.

4. The method of claim 3 wherein the concentration of said initiator introduced into said formation is an amount in the range of from about 0.001 to about 2.0 percent initiator by weight of said aqueous solution.

5. The method of claim 3 wherein said polymerizable monomer and said crosslinker are introduced into said formation in an aqueous solution wherein said polymerizable monomer is present in said aqueous solution in an amount in the range of from about 5 to about 20 pounds of said polymerizable monomer per 100 pounds of said aqueous solution and said crosslinker is present in said aqueous solution in an amount in the range of from about 0.5 to about 1.0 pounds of said crosslinker per 100 pounds of said aqueous solution.

6. The method of claim 5 wherein said polymerizable monomer is present in said aqueous solution in an amount in the range of from about 10 to about 15 pounds of said polymerizable monomer per 100 pounds of said aqueous solution.

7. The method of claim 6 wherein the concentration of said initiator introduced into said formation together with said polymerizable monomer and said crosslinker is an amount in the range of from about 0.05 to about 0.5 percent initiator by weight of said aqueous solution.

8. The method of claim 6 wherein said initiator is selected from the group consisting of 2,2'-Azobis(N,N'-dimethylene isobutyramidine)dihydrochloride, 2,2'-Azobis(2-amidinopropane)dihydrochloride and 2,2'-Azobis[2-methyl-N-(2hydroxethyl)propionamide].

9. The method of claim 8 wherein said polymerizable monomer is selected from the group consisting of acrylic acid, methacrylic acid, acrylamide, methacrylamide, 2-methacrylamido-2-methyl propane sulfonic acid, 2-acrylamido-2-methyl propane sulfonic acid, N,N-dimethyl acrylamide, vinyl sulfonic acid, N,N-dimethylaminoethylmethacrylate, 2-triethylammoniumethyl methacrylate chloride, N,N-dimethylaminopropyl methacrylamide, methacrylamidopropyl trimethylammonium chloride, N-vinyl pyrrolidone, vinyl phosphonic acid and methacryloyloxyethyl trimethylammonium sulfate.

10. The method of claim 9 wherein said crosslinker is selected from the group consisting of glycerol dimethacrylate, glycerol diacrylate, ethoxylated glycerol dimethacrylate, ethoxylated glycerol diacrylate, propoxylated glycerol dimethacrylate, propoxylated glycerol diacrylate, ethoxylated glycerol trimethacrylate, ethoxylated glycerol triacrylate, propoxylated glycerol trimethacrylate, propoxylated glycerol triacrylate, ethoxylated trimethylol propane trimethacrylate, propoxylated trimethylolpropane trimethacrylate, ethoxylated trimethylolpropane triacrylate, propoxylated trimethylolpropane triacrylate, ethoxylated or propoxylated pentaerythritol di, tri or tetra methacrylate or acrylate, methylene-bis-acrylamide and methylene-bis-methacrylamide, polyethylene or polypropylene glycol diacrylate or dimethacrylate, allylmethacrylate and allylacrylate.

11. The method of claim 10 wherein said polymerizable monomer is present in said aqueous solution in an amount in the range of from about 10 to about 15 pounds of said monomer per 100 pounds of said aqueous solution.

12. The method of claim 11 wherein the concentration of said initiator is an amount in the range of from about 0.01 to about 1.0 percent initiator by weight of said aqueous solution.

13. The method of claim 12 wherein said polymerizable monomer is one of acrylic acid and 2-acrylamido-2-methylpropane sulfonic acid and said crosslinker is one of glycerol dimethacrylate and polyethylene glycol dimethacrylate.

14. The method of claim 5 wherein the concentration of said initiator introduced into said formation together with said polymerizable monomer and said crosslinker is an amount in the range of from about 0.01 to about 1 percent initiator by weight of said aqueous solution.

15. The method of claim 5 wherein said polymerizable monomer is represented by the general formula

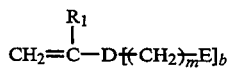

wherein:

$R_1 = -CH_3$ or $-H$,

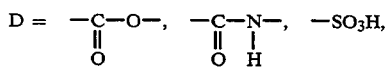

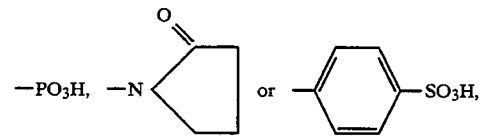

$E = -N(C_nH_{2n+1})_a$, $-C(CH_3)_2SO_3H$ or $-H$, n=1 or 2, a=2 or 3,
m=0, 1, 2 or 3 and b=0 or 1;
when

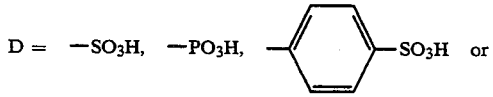

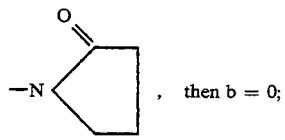, then b = 0;

when

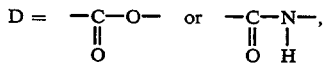

then b=1; and
when
a=3, then a suitable counter ion is present.

16. The method of claim 15 wherein said crosslinker is represented by the general formulas selected from the group consisting of $G(B-F-A)_x$, $B(F-A)_2$, $AG(F-A)$;

wherein

-continued
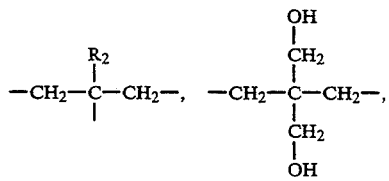
-continued
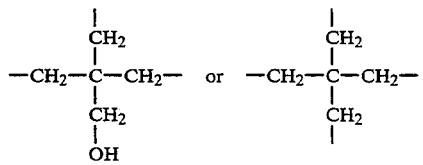
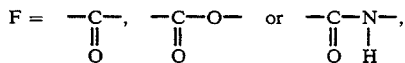
F can be the same or different,
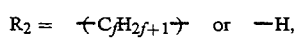
d=2 or 3,
e=0–20,
f=1 or 2 and
x=2, 3 or 4.
* * * * *